United States Patent
Everett et al.

(10) Patent No.: US 7,248,427 B1
(45) Date of Patent: Jul. 24, 2007

(54) METHOD AND APPARATUS FOR REDUCING VELOCITY ERRORS WHEN WRITING SPIRAL SERVO INFORMATION ONTO A DISK SURFACE

(75) Inventors: Tim Everett, Niwot, CO (US); Brian Rigney, Louisville, CO (US)

(73) Assignee: Maxtor Coporagion, Scotts Valley, CA (US)

( * ) Notice: Subject to any disclaimer, the term of this patent is extended or adjusted under 35 U.S.C. 154(b) by 572 days.

(21) Appl. No.: 10/858,845

(22) Filed: Jun. 2, 2004

Related U.S. Application Data

(60) Provisional application No. 60/475,048, filed on Jun. 2, 2003.

(51) Int. Cl.
    G11B 21/02 (2006.01)
    G11B 5/596 (2006.01)
(52) U.S. Cl. .................................. 360/75; 360/78.06
(58) Field of Classification Search ............... None
    See application file for complete search history.

(56) References Cited

U.S. PATENT DOCUMENTS

| | | | |
|---|---|---|---|
| 4,157,577 A | 6/1979 | Porter et al. ............. 360/78.14 |
| 4,587,579 A | 5/1986 | Cocke et al. ................. 360/75 |
| 5,003,412 A | 3/1991 | Bizjak et al. ............ 360/77.01 |
| 5,119,248 A | 6/1992 | Bizjak et al. ................. 360/75 |
| 5,164,863 A | 11/1992 | Janz ............................. 360/57 |
| 5,519,546 A | 5/1996 | Lewis .......................... 360/48 |
| 5,583,712 A | 12/1996 | Brunelle .................. 360/77.07 |
| 5,668,679 A | 9/1997 | Swearingen et al. .......... 360/75 |
| 5,793,559 A | 8/1998 | Shepherd et al. ........ 360/78.09 |
| 6,084,738 A | 7/2000 | Duffy .......................... 360/75 |
| 6,091,564 A | 7/2000 | Codilian et al. .............. 360/75 |
| 6,144,517 A | 11/2000 | Watanabe et al. ........ 360/77.04 |
| 6,388,833 B1 | 5/2002 | Golowka et al. ......... 360/77.02 |
| 6,476,995 B1 | 11/2002 | Liu et al. ..................... 360/75 |
| 6,507,450 B1 | 1/2003 | Elliott ..................... 360/77.08 |
| 6,587,293 B1 | 7/2003 | Ding et al. .................... 360/51 |
| 6,674,593 B2 | 1/2004 | Jolly et al. ..................... 360/51 |
| 6,714,376 B1 | 3/2004 | Brunnett et al. .............. 360/75 |
| 6,937,420 B1 | 8/2005 | McNab et al. ................. 360/75 |
| 6,943,978 B1 | 9/2005 | Lee ............................. 360/75 |
| 7,133,239 B1 * | 11/2006 | Hartman et al. .............. 360/75 |
| 2002/0145819 A1 * | 10/2002 | Kino et al. .................... 360/75 |

* cited by examiner

*Primary Examiner*—Andrew L. Sniezek
(74) *Attorney, Agent, or Firm*—Fellers, Snider, et al.

(57) ABSTRACT

The present invention is directed to a method and apparatus for reducing velocity errors when writing spiral servo information onto a disk surface of a disk drive. In one embodiment, a servo track writer is provided for moving a write head at a controlled velocity. The write head is used to write spiral servo information onto a disk surface. The write head is moved, using the servo track writer, at an actual velocity trajectory to simulate writing one spiral of spiral servo information. Differences between the actual velocity trajectory and a desired velocity trajectory are measured on a control sample by control sample basis over a window of control samples. The differences are integrated over the window. A gain, associated with the servo track writer controlling the velocity of the write head, is adjusted using the integrated differences.

14 Claims, 6 Drawing Sheets

METHOD AND APPARATUS FOR REDUCING VELOCITY ERRORS WHEN WRITING SPIRAL SERVO INFORMATION ONTO A DISK SURFACE

CROSS-REFERENCE TO RELATED APPLICATIONS

Priority is claimed from U.S. Provisional Patent Application Ser. No. 60/475,048 filed Jun. 2, 2003, which is incorporated herein by reference in its entirety.

FIELD OF THE INVENTION

The present invention relates generally to data storage devices, such as disk drives. More particularly, the present invention relates to a method and apparatus for reducing velocity errors (e.g., velocity overshoot and velocity undershoot) when writing spiral servo information onto a disk surface of a disk drive.

BACKGROUND OF THE INVENTION

Computer disk drives store information on magnetic disks. Typically, the information is stored on each disk in concentric tracks that are divided into sectors. Information is written to and read from a disk by a transducer that is mounted on an actuator arm capable of moving the transducer radially over the disk. Accordingly, the movement of the actuator arm allows the transducer to access different tracks. The disk is rotated by a spindle motor at high speed which allows the transducer to access different sectors on the disk.

A conventional disk drive, generally designated 10, is illustrated in FIG. 1. The disk drive comprises a disk 12 that is rotated by a spin motor 14. The spin motor 14 is mounted to a base plate 16. An actuator arm assembly 18 is also mounted to the base plate 16.

The actuator arm assembly 18 includes a transducer 20 mounted to a flexure arm 22 which is attached to an actuator arm 24 that can rotate about a bearing assembly 26. The actuator arm assembly 18 also contains a voice coil motor 28 which moves the transducer 20 relative to the disk 12. The spin motor 14, voice coil motor 28 and transducer 20 are coupled to a number of electronic circuits 30 mounted to a printed circuit board 32. The electronic circuits 30 typically include a read channel chip, a microprocessor-based controller and a random access memory (RAM) device.

The disk drive 10 typically includes a plurality of disks 12 and, therefore, a plurality of corresponding actuator arm assemblies 18. However, it is also possible for the disk drive 10 to include a single disk 12 as shown in FIG. 1.

FIG. 2 is a functional block diagram which illustrates a conventional disk drive 10 that is coupled to a host computer 33 via an input/output port 34. The disk drive 10 is used by the host computer 33 as a data storage device. The host 33 delivers data access requests to the disk drive 10 via port 34. In addition, port 34 is used to transfer customer data between the disk drive 10 and the host 33 during read and write operations.

In addition to the components of the disk drive 10 shown and labeled in FIG. 1, FIG. 2 illustrates (in block diagram form) the disk drive's controller 36, read/write channel 38 and interface 40. Conventionally, data is stored on the disk 12 in substantially concentric data storage tracks on its surface. In a magnetic disk drive 10, for example, data is stored in the form of magnetic polarity transitions within each track. Data is "read" from the disk 12 by positioning the transducer 20 above a desired track of the disk 12 and sensing the magnetic polarity transitions stored within the track, as the track moves below the transducer 20. Similarly, data is "written" to the disk 12 by positioning the transducer 20 above a desired track and delivering a write current representative of the desired data to the transducer 20 at an appropriate time.

The actuator arm assembly 18 is a semi-rigid member that acts as a support structure for the transducer 20, holding it above the surface of the disk 12. The actuator arm assembly 18 is coupled at one end to the transducer 20 and at another end to the VCM 28. The VCM 28 is operative for imparting controlled motion to the actuator arm 18 to appropriately position the transducer 20 with respect to the disk 12. The VCM 28 operates in response to a control signal $i_{control}$ generated by the controller 36. The controller 36 generates the control signal $i_{control}$ for example, in response to an access command received from the host computer 33 via the interface 40 or in response to servo information read from the disk surface 12.

The read/write channel 38 is operative for appropriately processing the data being read from/written to the disk 12. For example, during a read operation, the read/write channel 38 converts an analog read signal generated by the transducer 20 into a digital data signal that can be recognized by the controller 36. The channel 38 is also generally capable of recovering timing information from the analog read signal. During a write operation, the read/write channel 38 converts customer data received from the host 33 into a write current signal that is delivered to the transducer 20 to "write" the customer data to an appropriate portion of the disk 12. As will be discussed in greater detail, the read/write channel 38 is also operative for continually processing data read from servo information stored on the disk 12 and delivering the processed data to the controller 36 for use in, for example, transducer positioning.

FIG. 3 is a top view of a magnetic storage disk 12 illustrating a typical organization of data on the surface of the disk 12. As shown, the disk 12 includes a plurality of concentric data storage tracks 42, which are used for storing data on the disk 12. The data storage tracks 42 are illustrated as center lines on the surface of the disk 12; however, it should be understood that the actual tracks will each occupy a finite width about a corresponding centerline. The data storage disk 12 also includes servo information in the form of a plurality of radially-aligned servo spokes 44 (or wedges) that each cross the tracks 42 on the disk 12. The servo information in the servo spokes 44 is read by the transducer 20 during disk drive operation for use in positioning the transducer 20 above a desired track 42 of the disk 12. Among other things, the servo information includes a plurality of servo bursts (e.g., A, B, C and D bursts or the like) that are used to generate a Position Error Signal (PES) to position the write head relative to a track's centerline during a track following operation. The portions of the track between servo spokes 44 are used to store customer data received from, for example, the host computer 33 and are referred to as customer data regions 46.

It should be understood that, for ease of illustration, only a small number of tracks 42 and servo spokes 44 have been shown on the surface of the disk 12 of FIG. 3. That is, conventional disk drives include one or more disk surfaces having a considerably larger number of tracks and servo spokes.

During the disk drive manufacturing process, a special piece of equipment known as a servo track writer (STW) is used to write the radially-aligned servo information which forms servo spokes 44. A STW is a very precise piece of equipment that is capable of positioning the disk drive's write head at radial positions over the disk surface, so that servo information is written on the disk surface using the disk drive's write head with a high degree of positional accuracy.

In general, a STW is a very expensive piece of capital equipment. Thus, it is desirable that a STW be used as efficiently as possible during manufacturing operations. Even a small reduction in the amount of data needed to be written by the STW per disk surface can result in a significant cost and time savings.

A STW is used to write servo information, by controlling the position of the disk drive's write head, on a disk surface in a circumferential fashion at each radius at which the disk drive's write head is positioned. During drive operation, the servo information is used to position the transducer of the disk drive over the appropriate data track and data sector of the disk. Accordingly, as the number of tracks per inch (TPI) increases, the amount of time necessary to write servo information increases. That is, the number of circumferential passes that a STW must make over a disk surface increases as TPI increases. Thus, unless more STWs are supplied, manufacturing times will continually increase as the TPI increases.

Instead of using a STW to write servo information in a circumferential fashion at each radius, the assignee of the present invention presently uses a STW to write servo information in a spiral fashion (in at least some of its disk drives). Specifically, the STW moves the write head in a controlled manner (e.g., at a constant velocity or along a velocity profile) from a location near the outer diameter of the disk to a location near the inner diameter of the disk (or visa-versa) as the disk spins.

FIG. 4 is a diagrammatic representation of a disk surface 210 having a first spiral of servo information 215 written thereon. The dashed line, identified by reference numeral 220, represents a track. The first spiral of servo information 215 may make multiple revolutions around the disk surface 210 (roughly two revolutions as shown in FIG. 4), but only crosses track 220 once.

FIG. 5 is a diagrammatic representation of a disk surface 210 having a first spiral of servo information 215 and a second spiral of servo information 225 written thereon. As shown in FIG. 5, the first and second spirals 215, 225 are interlaced with one another and are written approximately 180 degrees apart. Again, each spiral crosses track 220 only once.

Additional spirals of servo information may be written on the disk surface 210 depending upon the servo sample rate (that is, the number of servo samples required for each track 220 to keep the disk drive's transducer sufficiently on-track). For example, if a servo sample rate of 120 equally-spaced servo sectors per track was required, 120 equally-spaced spirals would be written on the disk surface 110. Accordingly, by writing servo information in a spiral fashion, the time necessary to write servo information on disk surface 110 using the STW is a function of the servo sample rate (i.e., the number of spirals of servo information to be written) rather than the number of tracks.

Referring again to FIGS. 4 and 5, the spirals of servo information are written by moving the disk drive's write head using the STW in a generally radial direction (more accurately, in a radial direction along an arc due to the position of the bearing assembly), while both the disk is spinning and the write head is enabled. The direction of disk rotation is indicated by an arrow as shown in each of FIGS. 4 and 5.

The disk drive's write head is enabled for nearly its entire stroke (i.e., from a position near the OD to a position near the ID or visa-versa) while under the control of the STW. As a result, a continuous spiral of servo information is written.

Each of the spirals of servo information includes sync marks written at fixed time intervals by the disk drive's write head. As mentioned above, the STW is used to move the disk drive's write head at some fixed velocity (or velocity profile) in a generally radial direction across the disk surface. If the time interval between sync marks is known and the velocity of the disk drive's write head is known, the distance between sync marks along a spiral can be determined. Specifically, the following formula may be applied: Distance=(STW Velocity)(Time), where Distance represents the radial distance between sync marks, Velocity represents the radial velocity of the disk drive's write head (under control of the STW) and Time represents the interval between sync marks.

For example, the interval between sync marks may be set at 1 microsecond, while the write head may be controlled to move at a radial velocity of 10 inches per second along its stroke. Thus, the radial distance between sync marks can be calculated to be 1 microinch along each spiral.

Each sync mark along a given spiral corresponds to a unique radius. Accordingly, the sync marks may be used to accurately position a transducer of a disk drive over the disk surface.

While it might be desirable to write spiral servo information across the entire disk surface (as shown in FIGS. 4 and 5), in practice, this is not the case. Instead, the servo track writer brings the write head from zero velocity to a constant velocity over a relatively short period of time. Spiral servo information is not written until the write head is brought to a constant velocity. Accordingly, there is some portion of the disk surface onto which spiral servo information cannot be written because the write head has not been brought to a constant velocity.

It is desirable for the servo track writer to bring the disk drive's write head to a constant velocity as soon as possible, so that more of the disk surface may be used to write spiral servo information (and, hence, so that more of the disk surface may be used to write final servo information, if final servo patterns are self-servo written using spiral servo information). Using a servo track writer in this manner presents new problems, as prior servo track writers only were required to move the disk drive's write head in small radial steps across the disk surface.

One problem relates to velocity overshoots and undershoots. Specifically, in bringing the write head from zero velocity to a constant velocity, the servo track writer's pushpin is designed to follow a velocity trajectory. (As is well-understood by those skilled in the art, the servo track writer's pushpin provides a mechanical linkage between the servo track writer and the disk drive.) However, because of gain variation and other errors, the velocity of the servo track writer's pushpin deviates from the desired velocity trajectory at a transition point between an initial acceleration region and a zero acceleration region, resulting in either velocity overshoots or velocity undershoots. These velocity errors are written into the spiral servo information (e.g., sync marks are not placed at their proper locations). When the spiral servo information is used for self-servo writing, the velocity errors may be propagated into the final servo patterns.

Accordingly, it would be desirable to develop a technique for reducing velocity overshoots and undershoots when transitioning from the initial acceleration region to the zero acceleration region.

SUMMARY OF THE INVENTION

The present invention is designed to meet some or all of the aforementioned, and other, needs.

The present invention is directed to a method and apparatus for reducing velocity errors when writing spiral servo information onto a disk surface of a disk drive.

In one embodiment, a servo track writer is provided for moving a write head at a controlled velocity. The write head is used to write spiral servo information onto a disk surface. The write head is moved, using said servo track writer, at an actual velocity trajectory to simulate writing a spiral of spiral servo information. Differences between the actual velocity trajectory and a desired velocity trajectory are measured on a control sample by control sample basis over a window of control samples. The differences are integrated over the window. A gain, associated with the servo track writer controlling the velocity of the write head, is adjusted using the integrated differences. After the gain is adjusted a plurality of times by repeatedly simulating spirals of spiral servo information, the write head writes spiral servo information onto the disk surface, while said servo track writer controls the velocity of the write head.

Other embodiments, objects, features and advantages of the invention will be apparent from the following specification taken in conjunction with the following drawings.

DETAILED DESCRIPTION OF THE PREFERRED EMBODIMENT

Figure 1:
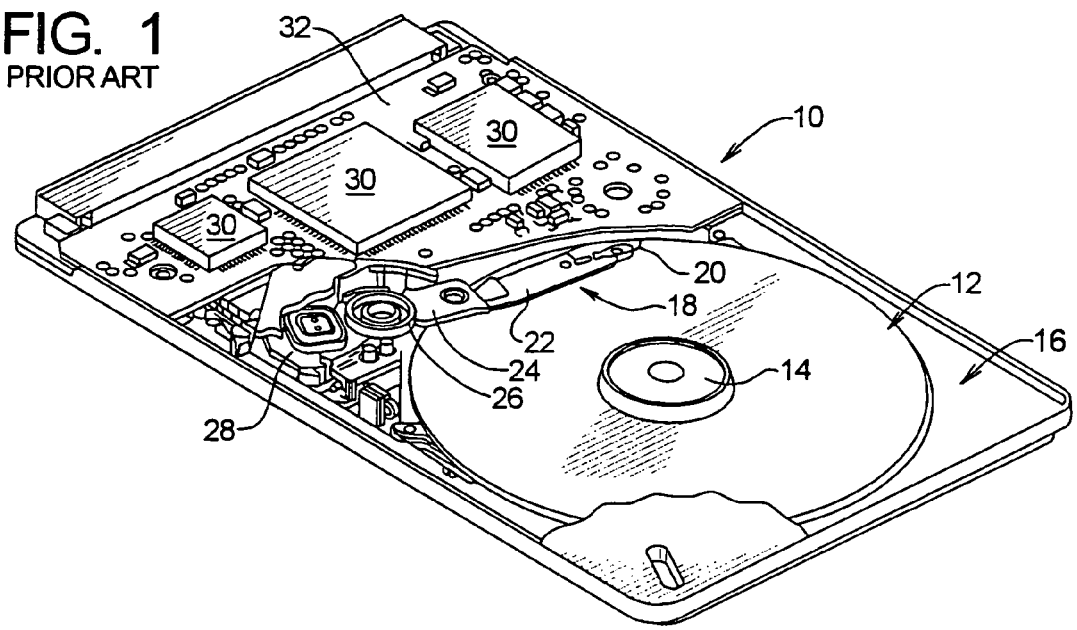
FIG. 1 is a diagrammatic representation illustrating a conventional disk drive with its top cover removed.
Figure 2:
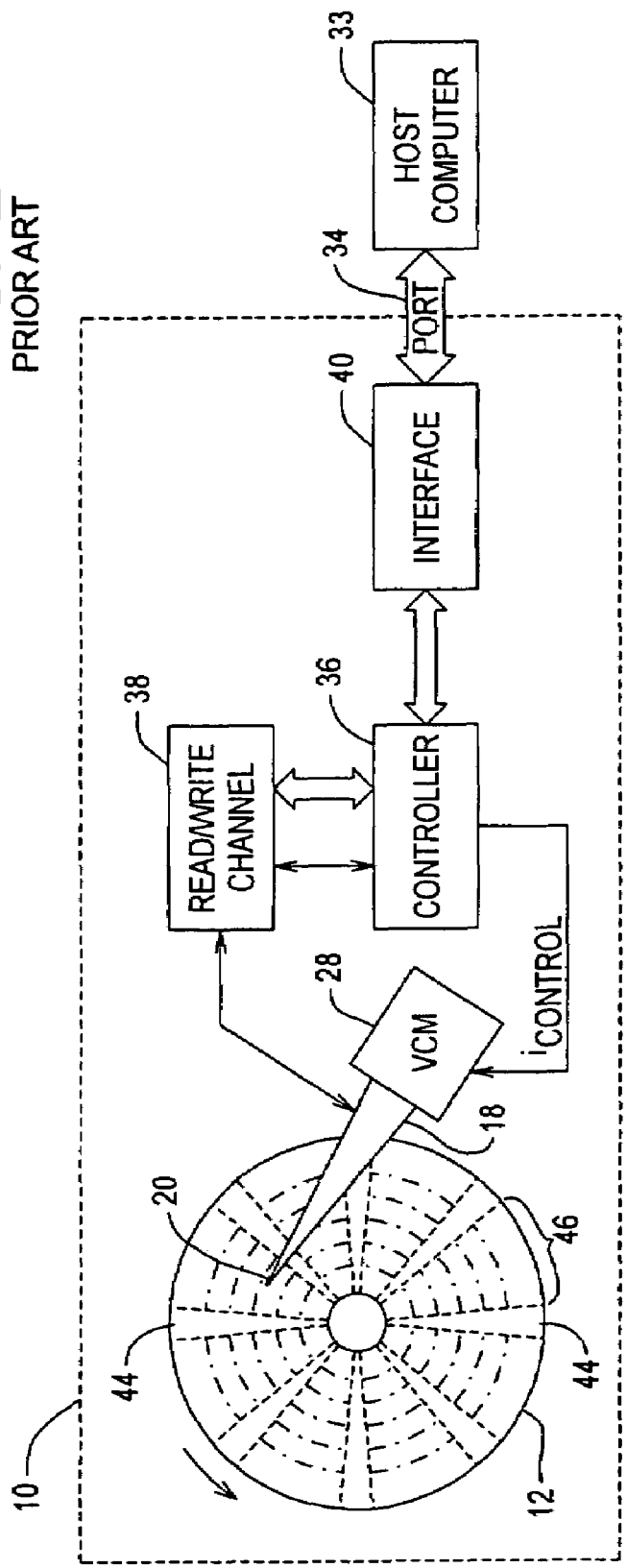
FIG. 2 is a functional block diagram which illustrates a conventional disk drive that is coupled to a host computer via an input/output port.
Figure 3:
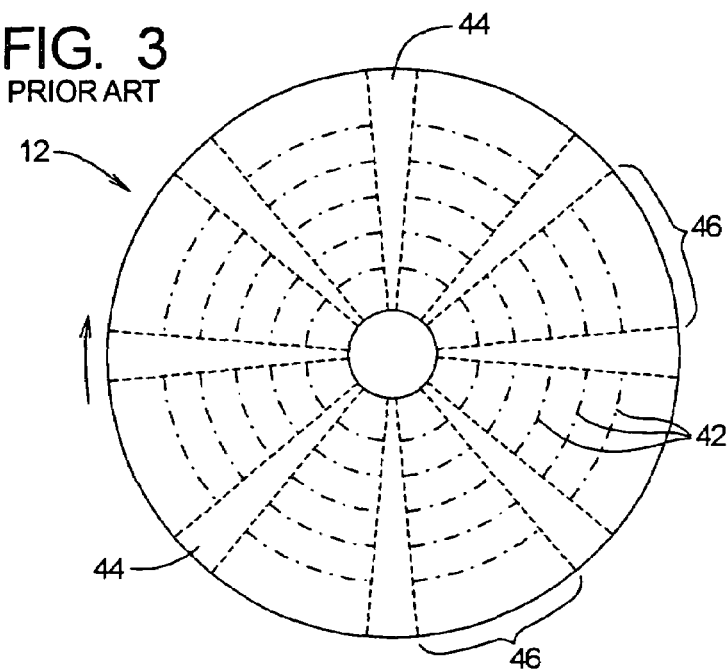
FIG. 3 is a diagrammatic representation of a top view of a magnetic storage disk illustrating a typical organization of data on a disk surface.
Figure 4:
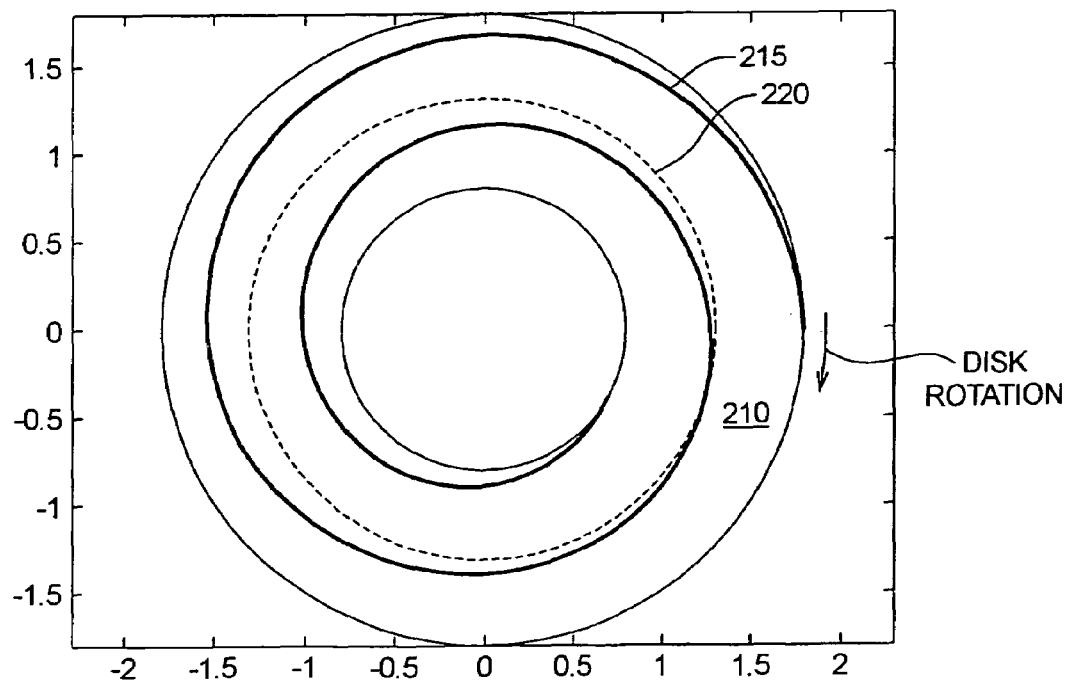
FIG. 4 is a diagrammatic representation of a disk surface having a spiral of servo information written thereon, along with a circular data storage track.
Figure 5:
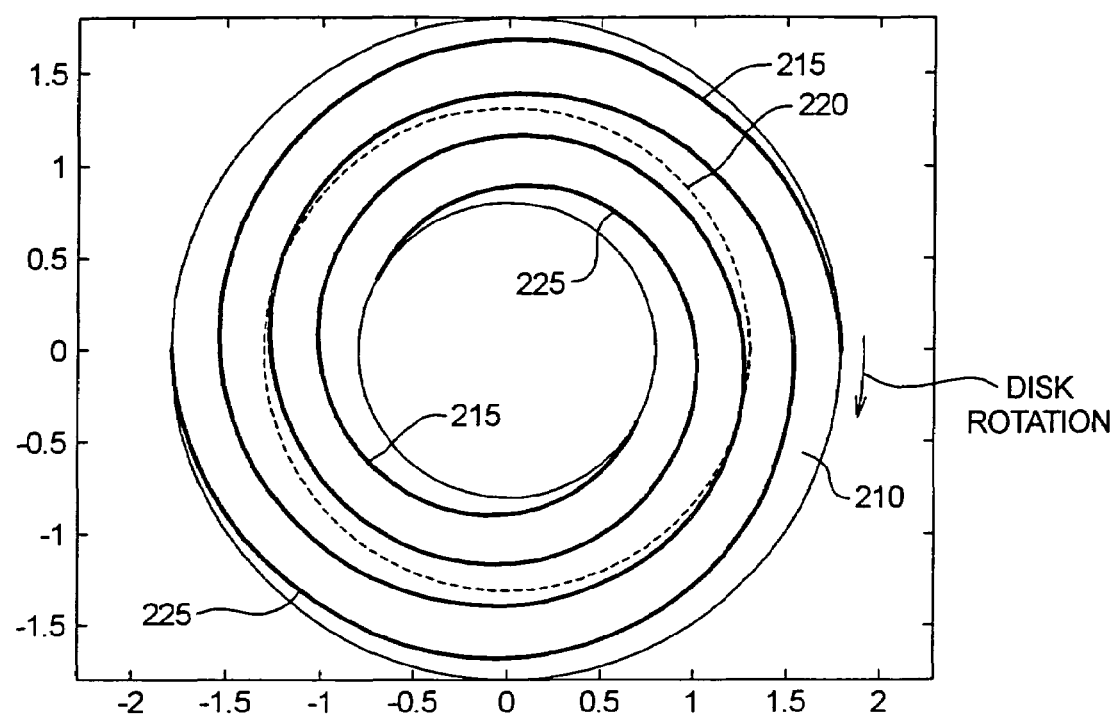
FIG. 5 is a diagrammatic representation of a disk surface having two spirals of servo information written thereon, along with a circular data storage track.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

Prior to writing spiral servo information onto the disk surface, the write head may be positioned with its actuator arm against a crash stop. That is, the write head will not be over the disk surface or will be in a position very close to the inner diameter or outer diameter of the disk surface.

Figure 6:
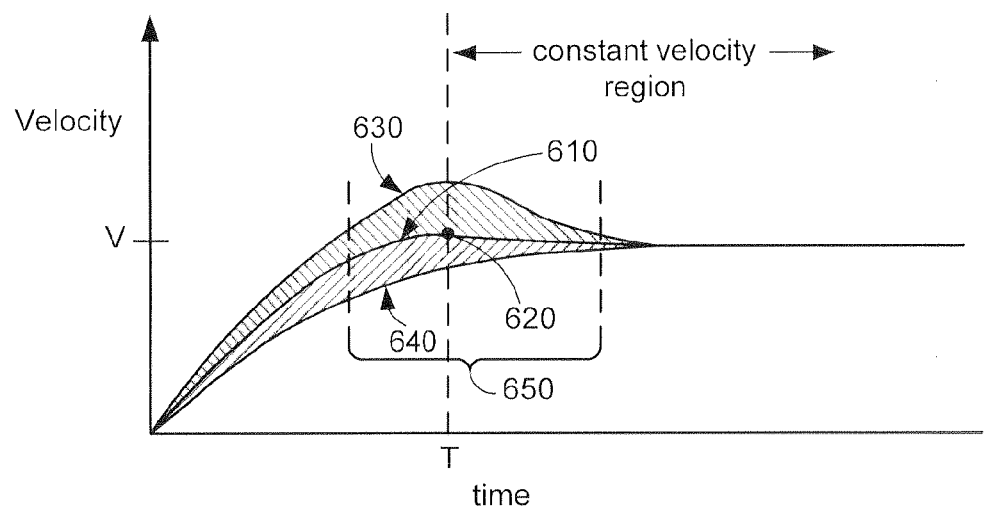
FIG. 6 is used to describe one embodiment of the present invention, and includes a diagrammatic representation of a desired velocity trajectory, a velocity trajectory with overshoot and a velocity trajectory with undershoot; and, FIG. 7 is a flowchart used to describe one embodiment of the present invention.

In order to quickly bring the write head to a constant velocity over the disk surface, a gain associated with the servo track writer is set so that the servo track writer's pushpin follows a desired velocity trajectory. A diagrammatic representation of a desired velocity trajectory 610 is shown in FIG. 6. It should be understood that FIG. 6 is provided for illustrative purposes only and does not represent actual data.

As shown in FIG. 6, the desired velocity profile includes an initial acceleration region (i.e., where the desired velocity values are changing) and a zero acceleration region (i.e., where the desired velocity is constant value, shown as V). The zero acceleration region may also be referred to as the constant velocity region, as shown in FIG. 6. A transition point 620 is identified along the desired velocity trajectory.

As mentioned above, because of gain variation and other errors, the velocity of the servo track writer's pushpin deviates from the desired velocity trajectory when transitioning from the initial acceleration region to the zero acceleration region. A diagrammatic representation of a velocity trajectory with overshoot is identified by reference numeral 630, while a diagrammatic representation of a velocity trajectory with undershoot is identified by reference numeral 640. Again, the trajectories 630, 640 are provided for illustrative purposes only and do not represent actual data.

As can be seen in FIG. 6, if the servo track writer's pushpin actually followed the velocity profile with overshoot, the velocity of the servo track writer's pushpin would be greater than constant velocity V over some period in the constant velocity region. Likewise, if the servo track writer's pushpin actually followed the velocity profile with undershoot, the velocity of the servo track writer's pushpin would be less than constant velocity V over some period in the constant velocity region.

The disk drive's write head is designed to write spiral servo information onto the disk surface at time T. That is, it is assumed that the write head, under control of the servo track writer's pushpin, is moving at a constant velocity at time T, because the servo track writer's pushpin is following the desired velocity profile. When the servo track writer's pushpin experiences velocity errors and does not follow the desired velocity profile, these velocity errors are written into the spiral servo information.

Before writing spiral servo information, warm-up spirals are performed to account for thermal changes that may occur during the process of writing spiral servo information onto the disk surface. That is, the servo track writer's pushpin follows (or attempts to follow) the desired velocity profile and moves the disk drive's write head. However, the disk drive's write head does not write any spiral servo information onto the disk surface. A predetermined number of warm-up spirals (e.g., 20 warm-up spirals) may be performed. An example thermal warm-up regimen is described in U.S. patent application Ser. No. 10/788,242 entitled "Methods And Apparatuses For Writing Spiral Servo Patterns Onto A Disk Surface" filed Feb. 26, 2004, which is incorporated herein by reference.

Figure 7:
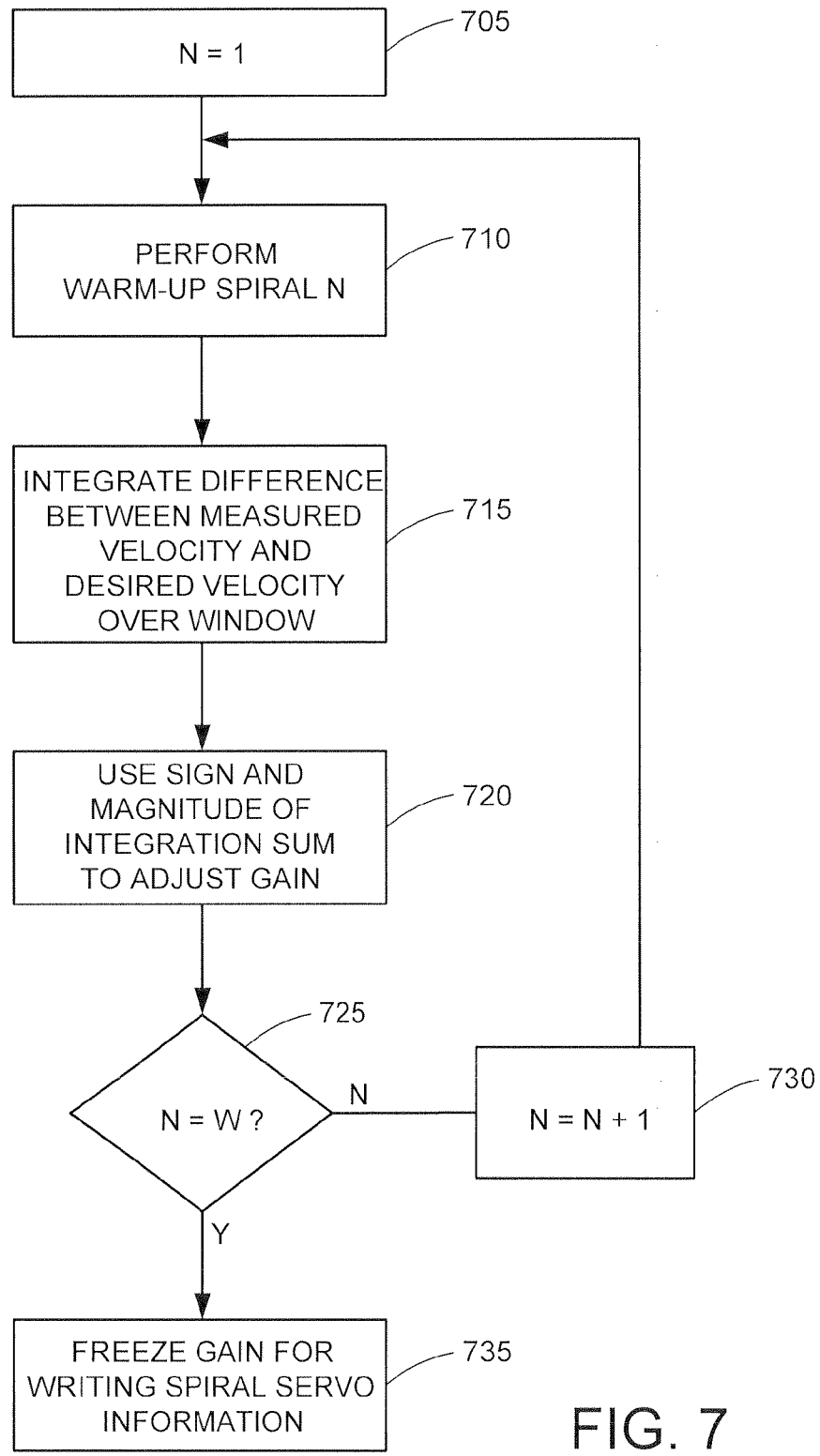

FIG. 7 is used to describe one embodiment of the present invention. First, an initialization is performed, where variable N is set to 1 (step 705). Then, warm-up spiral N is performed (step 710).

Next, the difference between the measured velocity and the desired velocity is integrated over a predefined window of control samples (step 715). Reference is made to FIG. 6, which shows a window 650. The window 650 is shown for illustrative purposes only and does not represent the size of an actual window. The size of an actual window is determined by trial-and-error.

As shown FIG. 6, the window begins in the initial acceleration region and the window ends in the zero acceleration region. The upper shaded area (between the velocity trajectory with overshoot and the desired velocity trajectory) represents the magnitude of an integration sum for an overshoot situation, which is calculated by integrating the difference between the measured velocity (curve 630) and the desired velocity (curve 620) over the window 650. Similarly, the lower shaded area (between the desired velocity trajectory and the velocity trajectory with undershoot) represents the magnitude of an integration sum for an overshoot situation, which is calculated by integrating the difference between the desired velocity (curve 620) and the measured velocity (curve 640) over the window 650. The sign of the integration sum depends upon whether an overshoot condition exists or an undershoot condition exists.

The magnitude and sign of the integration sum are used to adjust the feedback gain of the servo loop associated with the servo track writer (step 720). It should be understood that the above measurements do not provide an exact indication of the how much the gain should be adjusted. Instead, the magnitude and the sign of the integration sum can be thought of as pushing the gain in the right direction in small steps. Since the process will be repeated for many warm-up spirals, as described below, the gain will eventually converge.

In order to ensure that the gain is adjusted in small steps, a gain adjustment factor may be multiplied with the integration sum. The gain adjustment factor is determined by trial-and-error.

Steps 715 and 720 can be expressed by the following mathematical equation:

$$G = G + \left[ \sum_{i=winstart}^{winend} (Vmeasured_i - Vdesired_i) \right] \times AdjustFactor$$

where G is the Gain, $Vmeasured_i$ is the measured velocity at the $i^{th}$ sample, $Vdesired_i$ is the desired velocity at the $i^{th}$ sample, winstart represents a sample at the beginning of the window, winend represents a sample at the end of the window, and AdjustFactor is an adjustment factor having a value that is determined by trial-and-error.

Returning to FIG. 7, a determination is made as to whether there are any more warm-up spirals to be performed, where W is the total number of warm-up spirals (step 725). If there are more warm-up spirals to be performed, then N is incremented (step 730) and the process returns to step 710.

On the other hand, if there are no more warm-up spirals to be performed, then no more adjustments are made to the gain G. That is, the gain G is frozen while spiral servo information is written onto the disk surface (step 735).

As will be appreciated by those skilled in the art, overshoot is typically a second order response (damped sine wave) where the overshoot is generally followed by a period of undershoot. Accordingly, in another embodiment, a second integration window is provided to measure this undershoot. More specifically, the undershoot is measured using the same formula as above with the sign reversed to integrate the sum of the undershoot error over a second window immediately following the first window. The two integration sums are then added together and the result is used to adjust the gain. This increases the sensitivity of the measurement since the integration is being performed over a larger area. The size of the second window is determined by trial-and-error.

In one embodiment, a dead zone is provided, wherein gain adjustments are not made if the integration sum is less than a predetermined value (preferably, close to zero). Again, this predetermined value may be determined by trial-and-error.

In one embodiment, 20 warm-up spirals are written. Accordingly, in step 725, the variable W equals 20.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method comprising the steps of:
providing a servo track writer for moving a write head at a controlled velocity, wherein said write head is used to write spiral servo information onto a disk surface;
moving said write head, using said servo track writer, at an actual velocity trajectory to simulate writing one spiral of spiral servo information;
measuring differences between the actual velocity trajectory and a desired velocity trajectory on a control sample by control sample basis over a window of control samples;
integrating said differences over said window;
adjusting a gain associated with the servo track writer for controlling the velocity of the write head using said integrated differences.

2. The method of claim 1 wherein, after the gain is adjusted, the write head is moved at a controlled velocity that is closer to the desired velocity trajectory than prior to adjusting the gain.

3. The method of claim 1 wherein the desired velocity trajectory includes an initial acceleration region and a zero acceleration region, and wherein the window begins in said initial acceleration region.

4. The method of claim 3 wherein the window ends in said zero acceleration region.

5. The method of claim 1 wherein the steps of moving, measuring, integrating and adjusting are performed a plurality of times.

6. The method of claim 5 wherein the plurality of times is 20 times.

7. The method of claim 5 wherein after adjusting the gain a plurality of times, the write head writes spiral servo information onto the disk surface while said servo track writer controls the velocity of the write head.

8. The method of claim 1 wherein, if the gain is adjusted, the write head is moved at a controlled velocity that is closer to the desired velocity trajectory than prior to adjusting the gain.

9. A method comprising the steps of:
providing a servo track writer for moving a write head at a controlled velocity, wherein said write head is used to write spiral servo information onto a disk surface;

moving said write head, using said servo track writer, at an actual velocity trajectory;

measuring differences between the actual velocity trajectory and a desired velocity trajectory on a control sample by control sample basis over a window of 5 control samples;

integrating said differences over said window;

adjusting a gain associated with the servo track writer for controlling the velocity of the write head using said integrated differences, if said integrated differences is greater than a predetermined threshold.

10. The method of claim 9 wherein the desired velocity trajectory includes an initial acceleration region and a zero acceleration region, and wherein the window begins in said initial acceleration region.

11. The method of claim 10 wherein the window ends in said zero acceleration region.

12. The method of claim 9 wherein the steps of moving, measuring, integrating and adjusting are performed a plurality of times.

13. The method of claim 12 wherein the plurality of times is 20 times.

14. The method of claim 12 wherein after adjusting the gain a plurality of times, the write head writes spiral servo information onto the disk surface while said servo track writer controls the velocity of the write head.

* * * * *